US012456998B2

(12) United States Patent
Crompton et al.

(10) Patent No.: US 12,456,998 B2
(45) Date of Patent: Oct. 28, 2025

(54) CAPACITY ENHANCEMENT IN A WIRELESS COMMUNICATIONS SYSTEM USING DISTRIBUTED ASYNCHRONOUS MULTI-USER DETECTION

(71) Applicant: A10 SYSTEMS INC, Lowell, MA (US)

(72) Inventors: Bryan Crompton, Lowell, MA (US); Apurva N Mody, Chelmsford, MA (US); David Simpson, Springfield, VA (US)

(73) Assignee: A10 SYSTEMS INC, Lowell, MA (US)

( * ) Notice: Subject to any disclaimer, the term of this patent is extended or adjusted under 35 U.S.C. 154(b) by 37 days.

(21) Appl. No.: 18/200,811

(22) Filed: May 23, 2023

(65) Prior Publication Data

US 2023/0378987 A1   Nov. 23, 2023

Related U.S. Application Data

(60) Provisional application No. 63/344,941, filed on May 23, 2022.

(51) Int. Cl.
| | |
|---|---|
| *H04B 1/10* | (2006.01) |
| *H04B 1/12* | (2006.01) |
| *H04L 1/00* | (2006.01) |
| *H04W 84/12* | (2009.01) |

(52) U.S. Cl.
CPC ........... *H04B 1/123* (2013.01); *H04L 1/0045* (2013.01); *H04W 84/12* (2013.01)

(58) Field of Classification Search
CPC ....... H04B 1/123; H04L 1/0045; H04W 84/12
USPC .......................... 375/350, 349, 316, 219, 295
See application file for complete search history.

(56) References Cited

U.S. PATENT DOCUMENTS

| | | | |
|---|---|---|---|
| 10,641,906 B2 | 5/2020 | Altrichter | |
| 2005/0095985 A1* | 5/2005 | Hafeoz | ............. H04L 25/03331 |
| | | | 455/67.11 |
| 2006/0223479 A1 | 10/2006 | Stanners | |

(Continued)

OTHER PUBLICATIONS

McManus et al.; "Experimental Analysis of Cross-Layer Sensing for Protocol-Agnostic Packet Boundary Recognition"; Dept. of Electrical Engineering, State University of New York (SUNY) at Buffalo, Buffalo, NY 14260, USA; Air Force Research Laboratory (AFRL), Rome, NY 13440, USA; Georgia Tech Research Institute (GTRI), Atlanta, GA 30332, USA; dated Nov. 18, 2020.

*Primary Examiner* — Zewdu A Kassa
(74) *Attorney, Agent, or Firm* — Polsinelli PC; Babak Monajemi

(57) ABSTRACT

One or more aspects of the present disclosure are directed to techniques for interference cancellation in the present of Multi-User Interference (MUI). In one aspect, a method includes receiving a mixture signal at a receiver, the mixture signal including a first intended signal and at least one interfering signal overlappingly transmitted with the first intended signal; processing the mixture signal to identify the at least one interfering signal, the processing including at least applying an adaptive filtering to a re-modulated version of each of the at least one interfering signal to yield at least one reconstructed interfering signal; and determining the first intended signal using the mixture signal and the at least one reconstructed interfering signal.

20 Claims, 10 Drawing Sheets

(56) References Cited

U.S. PATENT DOCUMENTS

| | | | |
|---|---|---|---|
| 2009/0086864 A1* | 4/2009 | Komninakis | H04B 1/10 455/296 |
| 2011/0311007 A1* | 12/2011 | Nuutinen | H04B 1/71072 375/350 |
| 2014/0254634 A1 | 9/2014 | Hsu et al. | |
| 2020/0205062 A1 | 6/2020 | Azizi et al. | |

* cited by examiner

CAPACITY ENHANCEMENT IN A
WIRELESS COMMUNICATIONS SYSTEM
USING DISTRIBUTED ASYNCHRONOUS
MULTI-USER DETECTION

CROSS REFERENCE TO RELATED
APPLICATIONS

The present application claims priority to Provisional Application No. 63/344,941, filed May 23, 2022, and entitled "System And Method For Capacity Enhancement In A Wireless Communications System Using Distributed Asynchronous Multi-User Detection And MIMO," the entire content of which is hereby incorporated by reference.

STATEMENT REGARDING FEDERALLY
SPONSORED RESEARCH OR DEVELOPMENT

This application was made with government support under Contract No. N6833521C0271 awarded by Office of Naval Research under Small Business Innovation Research. The U.S. Government has certain rights in this invention.

TECHNICAL FIELD

The subject matter of this disclosure generally relates to the field of wireless network operations and, more particularly, to Interference Cancellation for Multi-User Detection in view of Multi-User Interference.

BACKGROUND

Wireless broadband represents a critical component of economic growth, job creation, and global competitiveness because consumers are increasingly using wireless broadband services to assist them in their everyday lives. Demand for wireless broadband services and the network capacity associated with those services is surging, resulting in the development of a variety of systems and architectures that can meet this demand.

In a crowded airspace, where multiple different signals may be transmitted simultaneously over the same channel, separating desired signals at a receiver device from unwanted interfering signals is an ever-present challenge that needs to be addressed.

SUMMARY

One or more aspects of the present disclosure are directed to a multi-user detection and interference cancellation technique in the present of Multi-User Interference (MUI). As opposed to current techniques of channel sniffing and/or random back-offs to avoid signal collision/interference and determine whether a frequency channel is available for a transmitter to send a signal, the techniques presented herein allow for multiple transmitters to perform simultaneous transmission over a given frequency channel. A receive that may receive the simultaneously received signals will then perform the disclosed techniques to extract the intended signal from the interfering signals. As the number of channels become more limited and demand for channel use increases, the disclosed techniques offer an advantageous solution during peak times and heaving network traffic that can increase system throughput, especially for mission critical applications.

In one aspect, a method includes receiving a mixture signal at a receiver, the mixture signal including a first intended signal and at least one interfering signal overlappingly transmitted with the first intended signal; processing the mixture signal to identify the at least one interfering signal, the processing including at least applying an adaptive filtering to a re-modulated version of each of the at least one interfering signal to yield at least one reconstructed interfering signal; and determining the first intended signal using the mixture signal and the at least one reconstructed interfering signal.

In another aspect, the processing includes performing parameter estimation on the mixture signal to determine one or more characteristics of the first intended signal and the at least one interfering signal; identifying the at least one interfering signal based on the one or more characteristics of the first intended signal and the at least one interfering signal; and processing the at least one interfering signal.

In another aspect, processing the at least one interfering signal includes de-modulating the at least one interfering signal to yield at least one de-modulated interfering signal; and re-modulating the at least one de-modulated interfering signal to yield the re-modulated version of each of the at least one interfering signal.

In another aspect, the parameter estimation is performed using Cross Layer Sensing.

In another aspect, the adaptive filtering is a recursive adaptive filtering.

In another aspect, determining the first intended signal includes subtracting the at least one reconstructed interfering signal from the mixture signal to yield an estimated first intended signal; de-modulating the estimated first intended signal to yield a de-modulated first intended signal; and applying a Forward Error Correction (FEC) to recover the first intended signal.

In another aspect, the first intended signal and the at least one interfering signal are overlappingly transmitted in one or more of a frequency domain or a time domain.

In another aspect, the mixture signal is a signal transmitted within a tactical data link network.

In another aspect, the mixture signal is a wireless signal transmitted within a Wi-Fi system.

In another aspect, the first intended signal and the at least one interfering Signals are wireless Signals associated with different wireless communication protocols.

In one aspect, an apparatus includes one or more Memories having computer-readable instructions stored therein, and one or more Processors. The one or more Processors are configured to execute the computer-readable instructions to receive a mixture signal, the mixture signal including a first intended signal and at least one interfering signal overlappingly transmitted with the first intended signal; process the mixture signal to identify the at least one interfering signal, the processing including at least applying an adaptive filtering to a re-modulated version of each of the at least one interfering signal to yield at least one reconstructed interfering signal; and determine the first intended signal using the mixture signal and the at least one reconstructed interfering signal.

In one aspect, one or more non-transitory computer-readable media includes computer-readable instructions, which when executed by one or more Processors of a receive, cause the Receiver to receive a mixture signal, the mixture signal including a first intended signal and at least one interfering signal overlappingly transmitted with the first intended signal; process the mixture signal to identify the at least one interfering signal, the processing including at least applying an adaptive filtering to a re-modulated version of each of the at least one interfering signal to yield at least one reconstructed interfering signal; and determine the first intended signal using the mixture signal and the at least one reconstructed interfering signal.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
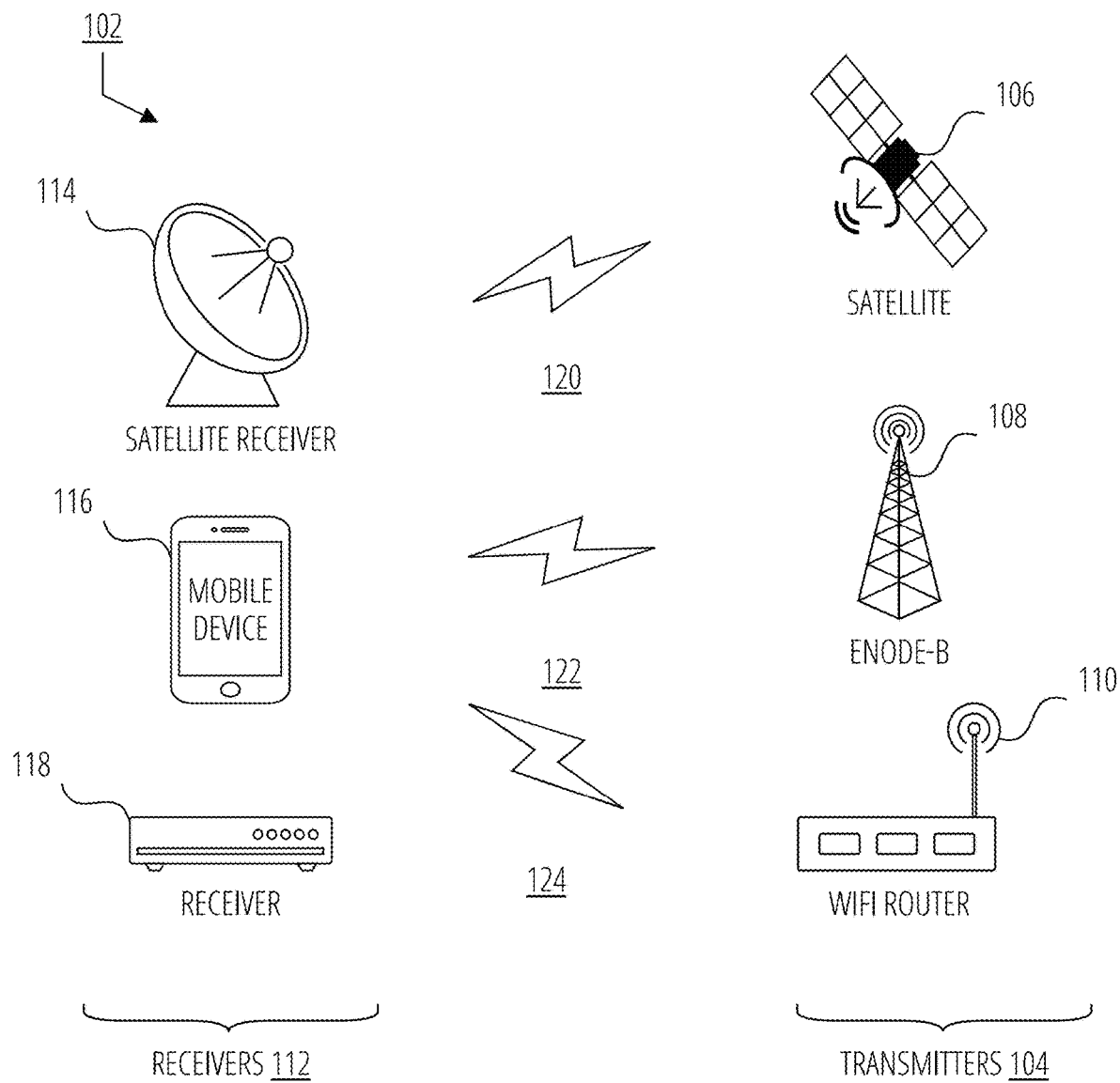
FIG. 1 illustrates an example environment in which wireless communications may take place according to some aspects of the present disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, in a crowded airspace, where multiple different signals may be transmitted simultaneously over the same channel, separating desired signals at a receiver device from unwanted interfering signals is an ever-present challenge that needs to be addressed.

Modern communications systems commonly suffer from interference and network congestion. These impairments affect the Quality of Service (QoS) for information delivery and Quality of Experience (QoE) for the users. In order to counter interference or congestion, it is useful to have situational awareness that detects and characterizes the problem and its location, and it is further useful to employ mitigation strategies (e. g. Dynamic Spectrum Access, Spectrum Aware Routing, Network Slicing). The present disclosure relates to a wide variety of use cases including space communications, communications for federal agencies, communications for defense applications, as well as wide variety of homogeneous and heterogeneous communications architectures including terrestrial 4G/5G/6G, Wi-Fi, Satellite Communications (SATCOM), Optical Fiber communications and combinations thereof.

One or more aspects of the present disclosure are directed to a multi-user detection and interference cancellation technique in the present of Multi-User Interference (MUI). As opposed to current techniques of channel sniffing and/or random back-offs to avoid signal collision/interference and determine whether a frequency channel is available for a transmitter to send a signal, the techniques presented herein allow for multiple transmitters to perform simultaneous transmission over a given frequency channel. A receive that may receive the simultaneously received signals will then perform the disclosed techniques to extract the intended signal from the interfering signals. As the number of channels become more limited and demand for channel use increases, the disclosed techniques offer an advantageous solution during peak times and heaving network traffic that can increase system throughput, especially for mission critical applications.

FIG. 1 illustrates an example environment in which wireless communications may take place according to some aspects of the present disclosure. Non-limiting example environment 102 can be any medium or environment in which terrestrial and/or extraterrestrial wireless communications may take place. The type of wireless communications can include, but are not limited to, satellite or radar communications, cellular-technology based wireless communications (e.g., 4G, LTE, 5G, etc.), known- or to be developed WiFi-based communications, etc. As may be known, any one or more of known or to be developed types of wireless communication may utilize licensed and/or unlicensed bands for transmission and reception of Signals. Each wireless communication scheme may operate according to relevant standards established and agreed upon for such wireless communication scheme (e.g., IEEE 802.11x standards for WiFi).

Available frequency spectrum for wireless communications does not grow linearly with the ever-increasing number of devices and systems that communicate using wireless communication schemes. Accordingly, as spectrum availability becomes scarce and more limited, multi-system or multi-user communication where a given frequency band and channel are used to simultaneously transmit multiple Signals (Signals operating based on the same or different types of communication schemes).

For instance, in environment 102 of FIG. 1, multiple example wireless communication systems may operate. Different types of transmitters (grouped as transmitters 104) may exist. Transmitters 104 may include Satellite 106, eNode-B 108, and WiFi Router 110. The number and types of transmitters 104 are not limited to that shown in FIG. 1. There can be more than one of each of type of transmitter shown as part of transmitters 104 (e.g., more than one Satellite 106, more than one eNode-B 108, more than one WiFi Router 110, etc.).

Environment 100 may further include Receivers 112. Receivers 112 may include a Satellite receiver 114 that can send or receive radar signals from to and from satellite 106. Receivers 112 may further include Mobile Device 116, Receiver 118, etc., each of which may be capable of receiving and/or transmitting wireless signals according to any one or more wireless communication protocols. The types and numbers of receivers are not limited to those shown in FIG. 1 and can include any number of the same type of receivers shown and/or any other type of known or to be developed equipment capable of sending and receiving wireless Signals.

Any one of example Receivers 112 may be configured to operate based on more than one type of wireless communication scheme. For instance, Mobile Device 116 can operate using cellular technology and WiFi technology, Receiver 118 may be capable of operating based on radar technology, cellular technology, and/or WiFi technology.

Various transmitted wireless Signals transmitted in environment 102 by any one of transmitters 104 for reception by an intended one(s) of Receivers 112 are shown as example Signals 120, 122, and 124.

In one example, any one of transmitters 104 can also operate as a receiver and similarly any one of Receivers 112 can operate as a transmitter.

As noted above, with the frequency spectrum becoming more limited and scarcer due to increase in demand, a single frequency channel may be utilized by more than one system for signal transmission and hence result in simultaneous use of the channel that can lead to Multi-User Interference (MUI). Various techniques have been introduced to avoid MUI (e.g., channel sniffing to determine whether a particular frequency channel is available for use and if not, implementing random back-offs until a channel becomes available).

Figure 2:
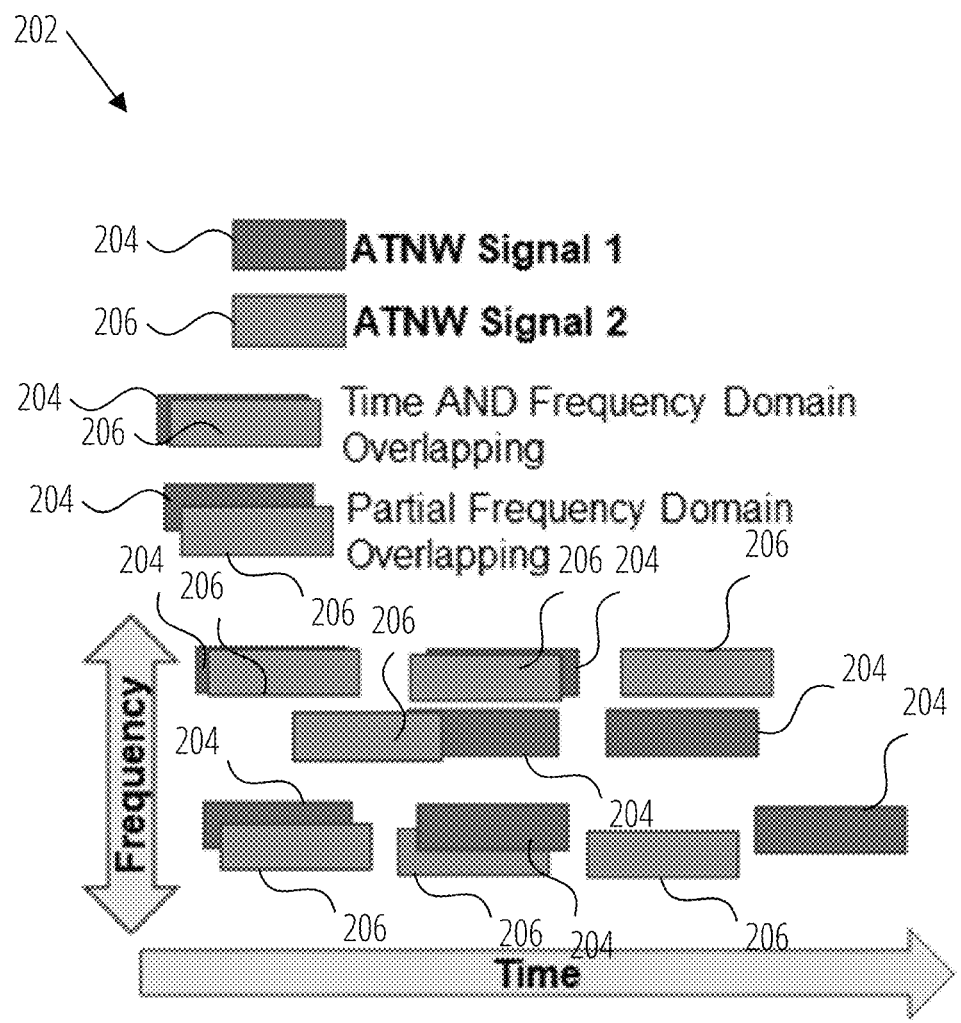
FIG. 2 illustrates an example scenario of overlapping transmission of Signals according to some aspects of the present disclosure.
Figure 3:
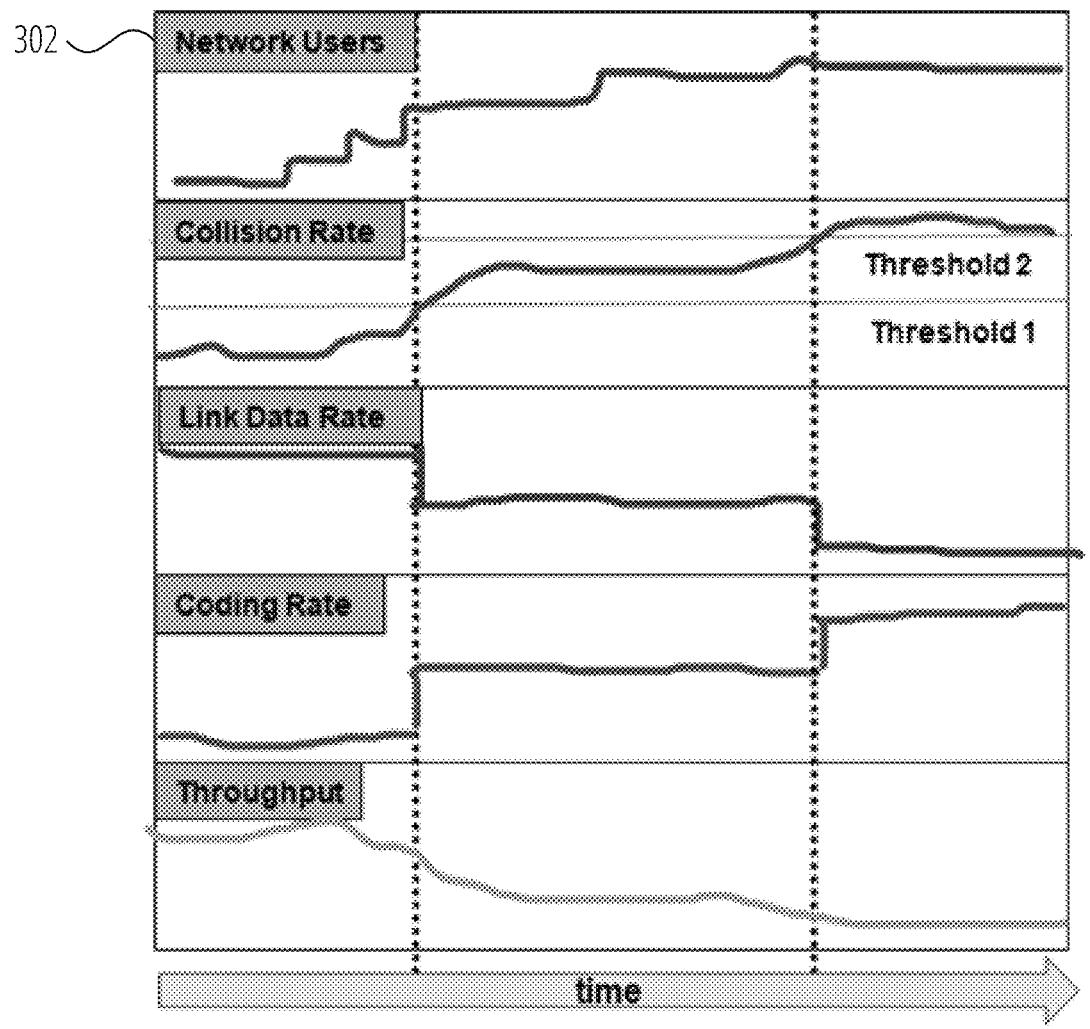
FIG. 3 illustrates effects of multi-user interface on network performance according to some aspects of the present disclosure.

FIGS. 2 and 3 illustrate some of the problems with MUI. FIGS. 2 and 3 illustrate MUI with reference to non-limiting example of wireless signal types used in military applications such as Advanced Tactical Networking Waveform (ATNW). However, the present disclosure is not limited thereto and the same MUI problem can exist with respect to any type of wireless communication scheme. The use of term packets in this disclosure applies to military systems such as Tactical Data Link (TDL), but it is equally applicable to any other wireless communication system such as WiFi systems. Wi-Fi operates using Carrier Sense Multiple Access Collision Avoidance (CSMA-CA). Wi-Fi uses partially overlapping channels. As the number of Wi-Fi Access Points (Aps) and devices in the neighborhood grows, CSMA-CA protocol senses that the channel is busy and uses backoff mechanisms to ensure that the packets do not collide. When the packets do collide, the protocol and technology does not have the means to perform interference cancellation to enable Multi-User Detection (MUD) to be able to recover information. Hence, the network throughput degrades with the congestion and interference. As will be described below and according to some aspects of the present disclosure, by relaxing CSMA-CA backoff mechanisms, allowing the packets to collide, and using technologies such as filtering mechanism described here, the throughput of the commercial systems such as Wi-Fi and hence network throughput can be increased. We provide an example of this using the ATNW Waveform. However, this technology is also applicable to commercial systems such as Wi-Fi, 4G/5G/6G, Long Range (LoRa) communication techniques, etc.

ATNW is based on Statistical Priority-based Multiple Access (SPMA) and suffers from MUI during periods of heavy traffic. This may also happen due to the reduction in the number of channels available for operation as noted above. The packet collision rate increases with the number of network users. In order to compensate for interference, coding rate increases, and throughput is reduced substantially.

FIG. 2 illustrates an example scenario of overlapping transmission of Signals, according to some aspects of the present disclosure. As shown in example 202 of FIG. 2, two ATNW Signals 204 and 206 may be simultaneously transmitted in the same frequency channel result in overlapping Signals in time and/or frequency domains.

FIG. 3 illustrates effects of multi-user interface on network performance according to some aspects of the present disclosure. As shown in graph 302, as the number of network users increases and overlapping signal transmissions occur, the collision rate increases while link data rate decreases. To mitigate MUI, coding rate increase, which adversely affects the network throughput.

Over the past two decades, algorithms have been developed that allow for Multi-User Detection (MUD), Interference Cancellation (IC), and signal separation enabling overlapping channel condition such that the network capacity could be effectively increased. As will be described fully below, the present disclosure provides another technique for increasing network capacity and throughput during the times of congestion by employing partially overlapping channels leveraging techniques or algorithms that can significantly suppress co-channel and adjacent channel interference. The proposed technique described herein may be referred to as Cognitive Asynchronous Multi-User Detection and Interference Cancellation Appliqué (CAMICA).

Figure 4:
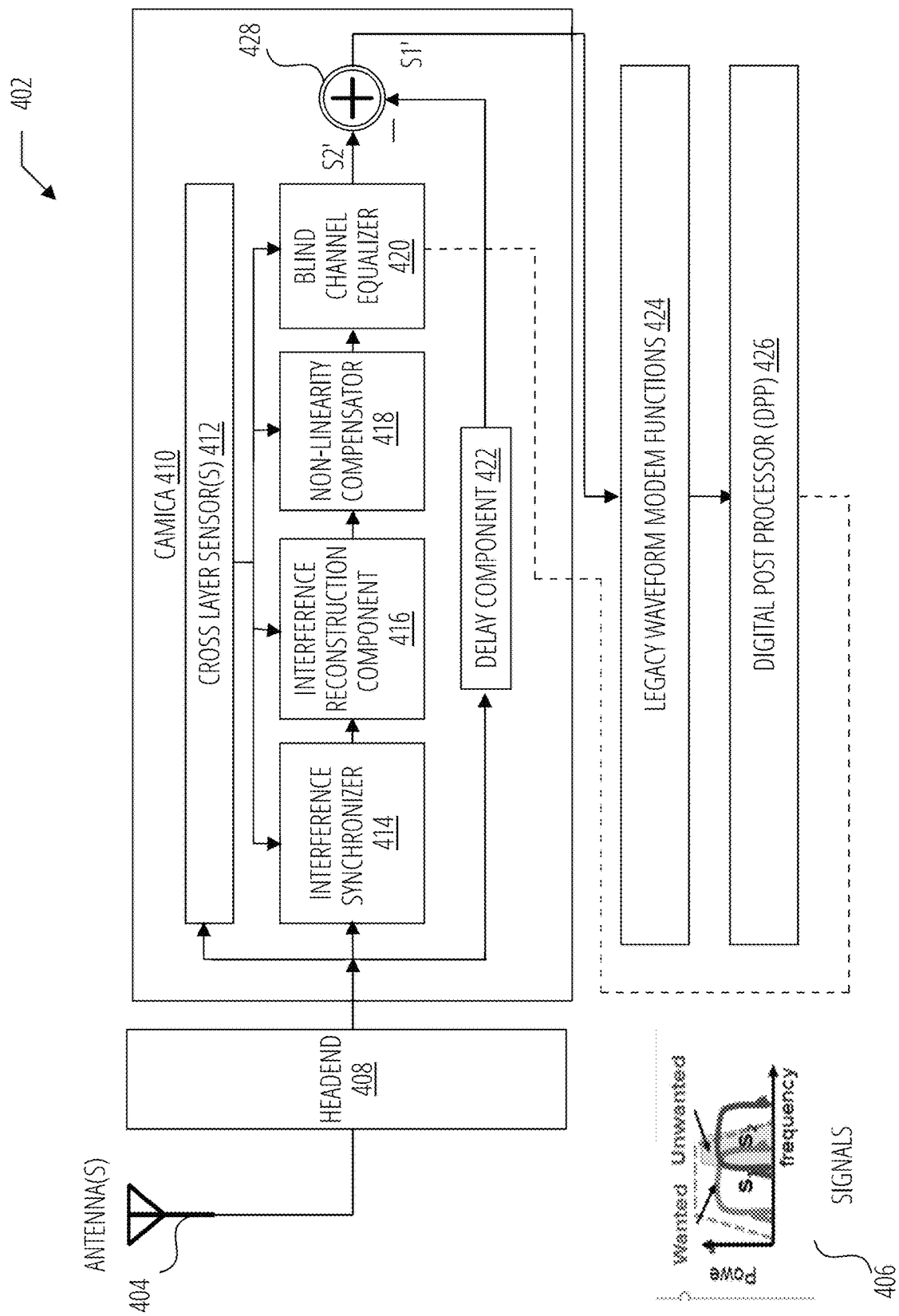
FIG. 4 illustrates an example Architecture for implementing CAMICA according to some aspects of the present disclosure.

FIG. 4 illustrates an example Architecture for implementing CAMICA according to some aspects of the present disclosure.

CAMICA and the underlying filtering techniques, which will be described hereinafter, may be implemented using a Field Programmable Gateway Array (FPGA). Such Architecture may be implemented within any Receiver such as one or more of Receivers 112.

As shown in FIG. 4, Receiver 402 can be any one of Receivers 112 described with reference to FIG. 1. Receiver 402 may have one or more antenna(s) 404 via which one or more Signals 406 may be received. In one example, Signals 406 may include two overlappingly transmitted Signals S1 and S2. In describing FIG. 4 it is assumed that S1 is a desired signal intended to be received by Receiver 402 while S2 is an interfering signal. While one intended signal S1 and one interfering signal S2 are referenced in describing FIG. 4, the present disclosure is not limited thereto and there can be more than one interfering signal S2.

Signals 406 may be received at Headend 408 of Receiver 402. Receiver 402 may implement logical structure of CAMICA 410 to implement Multi-User Detection (MUD) filtering techniques of the present disclosure to extract S1 from the mixture signal of S1 and S2 received at Receiver 402.

CAMICA 410 may include a number of logical components each implementing an aspect of CAMICA 410's filtering technique. Example logical components include, but are not limited to, Cross Layer Sensor(s) 412 (may also be referred to as Cross Layer Sensing engine), Interference Synchronizer 414, Interference Reconstruction Component 416, Non-Linearity Compensator 418, Blind Channel Equalizer 420, delay component 422, etc.

Receiver 402 may also include other components such as Legacy Waveform Modem Functions 424 and Digital Post Processor (DPP) 426, which will be described below.

CAMICA 410 may be designed such that capacity enhancements as a result of overlapped channels may be achieved with little to no modification to the existing TDL MODEM FPGA Fabric. Generic nature of CAMICA 410 allows interference cancellation for wide variety of Signals. CAMICA 410's filtering technique relies on Cross Layer Sensing (CLS), Interference Synchronization (IS), Interference Re-construction (IR), Non-Linearity Compensation (NLC) followed by Blind Channel Equalization (BCE) and Digital Post Processing (DPP). Blind Channel Equalizer 420 may utilize Asynchronous Multi-User Detection (A-MUD) technique either using Block Processing or Recursive Least Square (RLS). In some examples, Low Complexity Turbo MUD (LCT-MUD) may also be utilized.

As shown in FIG. 4, Signals 406 may be sent from Headend 408 to Cross Layer Sensor(s) 412, Interference Synchronizer 414 and delay component 422. CLS may be performed on Signals 406 while a number of processes (e.g., modulation, demodulation, RLS filtering, etc., all of which will be described below with reference to FIG. 5) may be performed in parallel on Signals 406 using Interference Synchronizer 414, Interference Reconstruction Component 416, Non-Linearity Compensator 418 and Blind Channel Equalizers 420. Output of Cross Layer Sensor(s) 412 may be fed into Interference Synchronizer 414, Interference Reconstruction Component s 416, Non-Linearity Compensator 418 and Blind Channel Equalizers 420, as they each perform an underlying part of processing on Signals 406.

Output of Blind Channel Equalizers 420 may be an estimation of S2 (S2'), which may then be subtracted from a delayed version of Signals 406 (delayed using delay components 422) to determine an estimation of S1 (S1'). The subtraction may be performed using component 428. S1' may then be processed for various signal processing purposes using Legacy Waveform Modem Functions 424 and Digital Post Processor (DPP) 426. Output of Digital Post Processor (DPP) 426 may be a clean/reconstructed version of intended signal S1.

In some examples, output of Digital Post Processor (DPP) 426 may be used as an adaptive filter to provide feedback to Blind Channel Equalizer 420 in order to improve future estimations of channel equalization parameters for estimation of S1.

CAMICA 410 may be designed and developed as an Appliqué that can be integrated with existing platforms such as Tactical Data Link (TDL) Platforms in a wide variety of ways. The Appliqué may reside as a separate module on the TDL slice, as a side-hat, as a sleeve or may be integrated into existing Intel Stratix 10 GX2800. However, the present disclosure is not limited to applicability of CAMICA 410 in TDL platforms and environments but may be designed to be implemented any type of wireless received to address co-channel and adjacent channel interference waveforms.

For MUD, the techniques proposed herein the following may be considered: synchronous vs asynchronous interference; dependence on parameter estimations such as symbol offsets, power, channel, etc.; many users vs two users; highly dispersive case vs little to no inter-symbol interference; coding aware vs coding agnostic; large block processing vs a filter-based or streaming approach; frequency offset or no-frequency offset; few or many iterations; high algorithmic complexity or low complexity.

A mathematical model for two conflicting pulses with no frequency offset may be represented by formula (1) as:

$$r(t)=A_1 e^{\phi 1 i} s_1(t-\tau_1)+A_2 e^{\phi 2 i} s_2(t-\tau_2)+n(t).$$

In formula (1), variables $A_1$ and $A_2$ are the amplitudes of S1 and S2, respectively, $\phi_1$ and $\phi_2$ are the carrier phases of S1 and S2, respectively, and $\tau_1$ and $\tau_2$ are the delays associated with S1 and S2, respectively. n(t) represents Gaussian noise. In the non-limiting example a mixture signal of S1 and S2, an assumption is made that $A_2$ is greater than $A_1$. Formula (1) may be generalized using formula (2) as:

$$r(t)=(A_1 e^{\phi 1 i} h_1 * s_1)(t)+(A_2 e^{\phi 2 i} h_2 * s_2)(t)+n(t),$$

In formula (2), $h_1$ and $h_2$ are the channels associated with S1 and S2, respectively. CAMICA approach presented herein relies on deconflicting S1 and S2 using Asynchronous Interference Cancellation (IC) Multi-User Detection (MUD) Approach.

Figure 5:
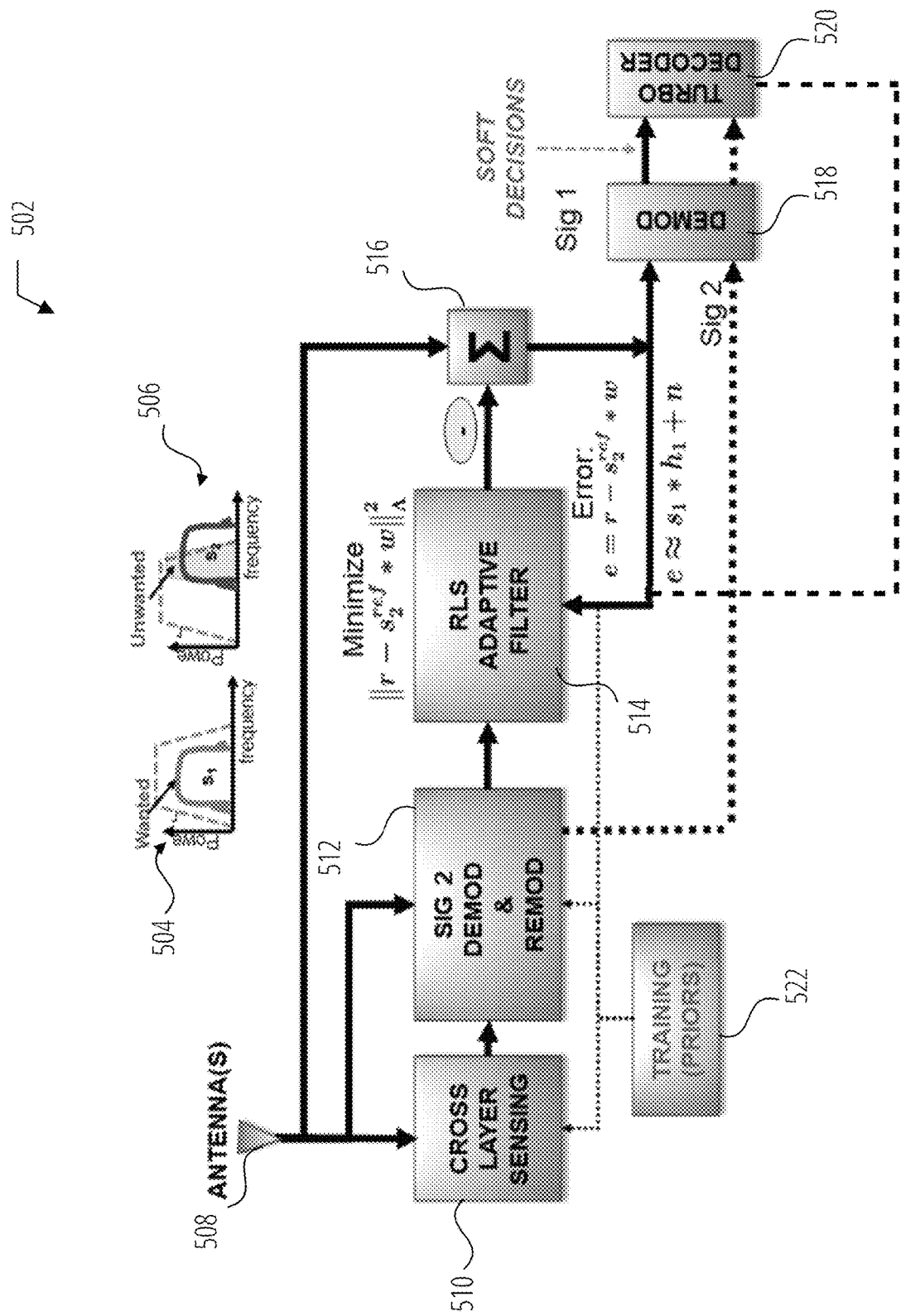
FIG. 5 illustrates an example of CAMICA's filtering technique according to some aspects of the present disclosure.

FIG. 5 illustrates an example of CAMICA's filtering technique according to some aspects of the present disclosure. Example logical Architecture 502 illustrates a series of processes that may be performed on a received mixture signal by CAMICA 410. As noted above with reference to FIG. 4, a mixture signal (mixture of S1 504 and S2 506 Signals) may be received at antenna(s) 508. Antenna(s) 508 may be the same as antenna(s) 404.

Upon receiving a mixture signal at antenna(s) 508, the received signal may undergo a number of processes. The first process may be CLS process 510. CLS may be performed according to any know or to be developed methodology to determine one or more characteristics of the received signal including, but not limited to, Noise Floor (NF), Signal to Interference plus Noise Ratio (SINR), Receiver Signal Strength Indicator (RSSI), Reference Signal Received Power (RSRP), Packet Error Rate (PER), Bit Error Rate (BER), Interference Detected notification from RF Sensing Module 346, etc. CLS process 510 may be performed by Cross Layer Sensor(s) 412. Cross Layer Sensor(s) 412 may interface with PHY, MAC, and NET layers of radio modems (e.g., in Receiver 402) and receive corresponding radio statistics and determine non-limiting features enumerated above.

Non-limiting Architecture of Cross Layer Sensor(s) 412 and the associated CLS process 510 may be as described in U.S. application Ser. No. 18/069,157, titled "Intelligent Network Slicing And Policy-Based Routing Engine," filed on Dec. 20, 2022, the entire content of which is incorporated herein by reference.

CLS process 510 may be used for parameter estimation. Assuming a completely blind approach to Asynchronous Multi-User Detection, a number of synchronization parameters need to be estimated. Synchronization parameters include, but are not limited to, the arrival of the signal, the carrier frequency, the carrier phase, the symbol frequency, the symbol phase, etc. For purposes of describing CAMICA techniques, an assumption is made that the carrier frequency and symbol frequency of S1 and/or S2 are known. But methods exist to estimate these parameters when they noticeable vary, as in the case of Doppler-shifted Signals. In one example, CAMICA's filtering techniques rely on best possible attempt to demodulate the larger of the received Signals (e.g., S1 and S2). The overall cancellation approach includes demodulating the larger signal. Hence, there is no need to estimate the parameters of the smaller signal before the smaller signal is sent to Receiver 402. In one aspect, the proposed techniques rely on estimating the carrier phase offset and the symbol phase offset of the larger GMSK pulse (e.g., S2) and approach this in both a training-aided non-blind scenario and a blind scenario.

The Training-aided synchronization parameter estimation approach is straightforward. A matched filter of the Pseudo Noise (PN) training sequence is applied to find the exact start and end of the signal, which immediately provides the moment of arrival and symbol phase offset. Then, angles of the training sequence are subtracted out of portion of the signal with the detected PN sequence, which is then averaged, to get an estimate of the carrier offset phase. This technique of leveraging known Preambles and Pilots to estimate the channel, frequency offsets and phase noise are also applicable for Wi-Fi systems.

In one example, properties of a GMSK signal may be exploited as follows. A remarkable property of a baseband GMSK signal S is that the real portion of $S^2$ is periodic. This means the real portion has a discrete spectrum, which can be used to estimate the symbol phase offset. However, this property holds when the initial phase of the signal is either 0 or $\pi$. For scenarios where a GMSK signal has a random initial phase that is not 0 or $\pi$, the phase can be found by searching over all phase rotations that split the real and imaginary portions of the signal squared into a discrete spectrum and a continuous spectrum. This computation may be based on formula (3) below:

$$\hat{\phi} = \underset{\phi}{\operatorname{argmin}} \|F\{\operatorname{Re}[N(e^{i\phi}s(t)^2)]\}\|^2$$

Where N( . . . ) is a notch filter that filters out the frequencies where discrete spectral peaks are expected to be based on the known symbol rate. Dividing this value by 4 gives an estimate of the carrier phase offset up to mod $\pi/2$. Thereafter, peaks in the discrete spectra may be selected and the associated phase is used to determine the symbol phase offset. One limitation of this method is that it can only estimate the phase offset up to $\pi/2$ due to symmetries related to squaring. However, these get alleviated when differential coding is used.

Figure 6:
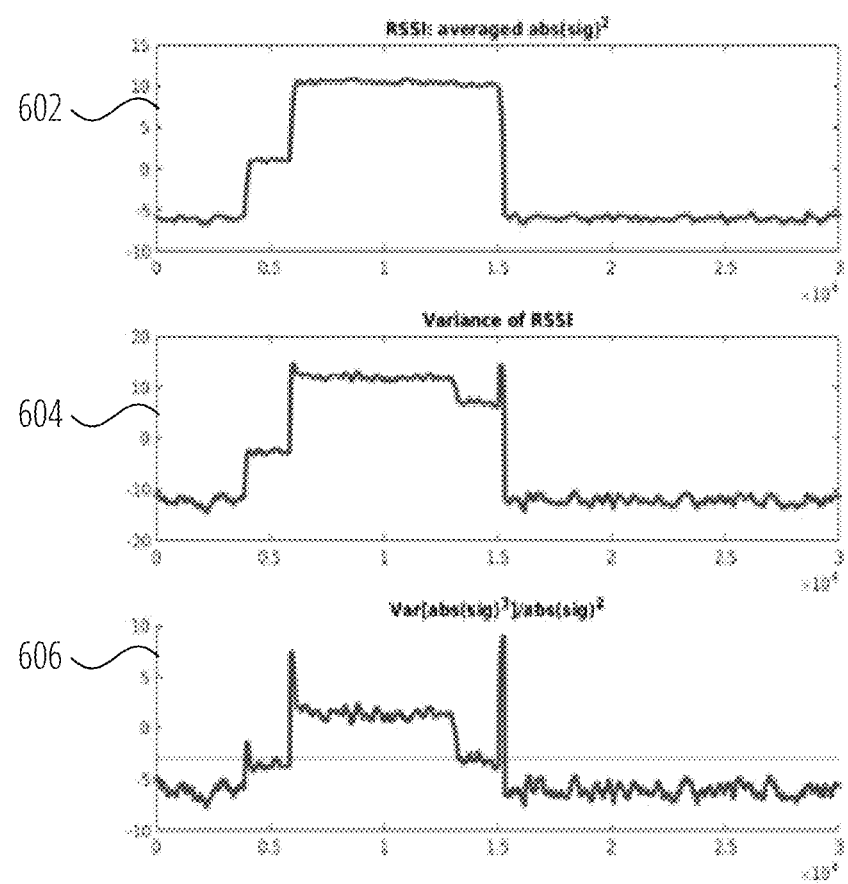
FIG. 6 illustrates examples of signal energy detection according to some aspects of the present disclosure.

FIG. 6 illustrates examples of signal energy detection according to some aspects of the present disclosure. Energy detection can distinguish when there is at least one signal by watching the received power compared to the noise floor. This is shown in FIG. 6 (plot 602). A similar effect is seen several samples later when the Received Signal Strength Indicator (RSSI) jumps again. However, because the strength of the second signal is large, it is difficult to detect when the smaller signal ends in time. This leads to plot 604, showing the variance of the unaveraged RSSI over a moving window. Mathematical analysis shows that two interfering GMSK signal result in a variance in the RSSI larger than the variance due to Gaussian Noise. From these, a final statistic, which is the variance divided by the RSSI, may be determined as shown in plot 606. For a single GMSK pulse, it is predicted that this statistic must be about 3 dB above the noise floor and that this statistic will be larger than 3 dB, its value depending on relative phase values and the resultant constructive or destructive interference. Preliminary efforts show that these detection methods provide coarse estimates of the boundaries of interference, up to about a symbol period 50% of the time. For purposes of interference cancelation, it is not necessary to find the bounds of interference but only the bounds of the larger signal, where the RLS filter is applied. This may be amenable to methods that use RSSI but do not need its variance.

With parameters estimated using CLS process 510 as described above, the received mixture signal may undergo a de-modulation and re-modulation process 512 for reconstructing S2 (e.g., the unwanted interfering signal).

In one example, interference cancellation utilizes both a demodulation and re-modulation process 512. In one example, any known or to be developed Gaussian Minimum Shift Keying (GMSK) Modulator and Demodulator may be used. GMSK is an integer Continuous Phase Modulation (CPM) with four phase states. GMSK is similar to Differential Quadrature Phase Shift Keying (DQPSK) but with a constant modulus and smooth phase transitions. GMSK Modulation takes (a) bit impulses, (b) applies a Gaussian-smoothed rectangular filter, (c) maintains a running sum of these values, and (d) substitutes this sum into a complex exponential as a varying phase component. The first two steps (a) and (b) are equivalent to constructing a Binary Phase Shift Keying (BPSK) signal. The controlling parameters are the symbol period and a constant known as BT (e.g., which may be set to 0.3. The value of BT is not limited to 0.3 but may be a configurable parameter determined based on experiments and/or empirical studies), which controls the decay of the Gaussian smoothed rectangular pulses. When no Gaussian smoothing is used, GMSK is equivalent to MSK.

FPGA implementations of GMSK Modulation consumes low resources. Algorithmically, the number of multiplications each iteration depends on the size of the Gaussian smoothed rectangular filter, which is the number of samples per symbol period or some small multiple of it. A running sum is a simple addition each step, and efficient trigonometric computations can be achieved with CORDIC algorithms. An independent implementation of a GMSK modulator would require marginal resources.

One example advantage of a CPM modulation is that the Viterbi algorithm can be used to improve the accuracy of the demodulation. A Trellis structure may be used on which the Viterbi algorithm is applied for GMSK demodulation. Aside from this consideration, there are many demodulation methods that may be used including coherent and non-coherent methods. Coherent methods utilize an estimate of the initial phase of the signal while non-coherent methods do not. An example of a non-coherent demodulation method is Cross-coupled baseband IQ detector. The method works by computing the phase change across a symbol. However, this does not perform well in low SNRs. Other coherent demodulation methods exist which perform better in low SNRs.

Referring back to FIG. 2, upon completion of modulation and demodulation of S2 at de-modulation and re-modulation process 512, an RLS adaptive filtering process 514 may be applied to the re-modulated S2. This process may be as follows.

RLS adaptive filtering process 514 is a process where a filter is determined to be applied to the re-modulated S2 to account for channel effects. A Recursive Least Squares Algorithm (RLS) may be used to find such filter. RLS may be used to minimize a least squares loss function shown in FIG. 5 (i.e. $\|r-s_2^{ref} \times \omega\|_\Lambda^2$) where 'r' is as defined in formula (1) and (2) above, $s_2^{ref}$ is the re-modulated S2 per the de-modulation and re-modulation process 512, and 'w' may be a vector of adaptive filter weights.

Figure 7:
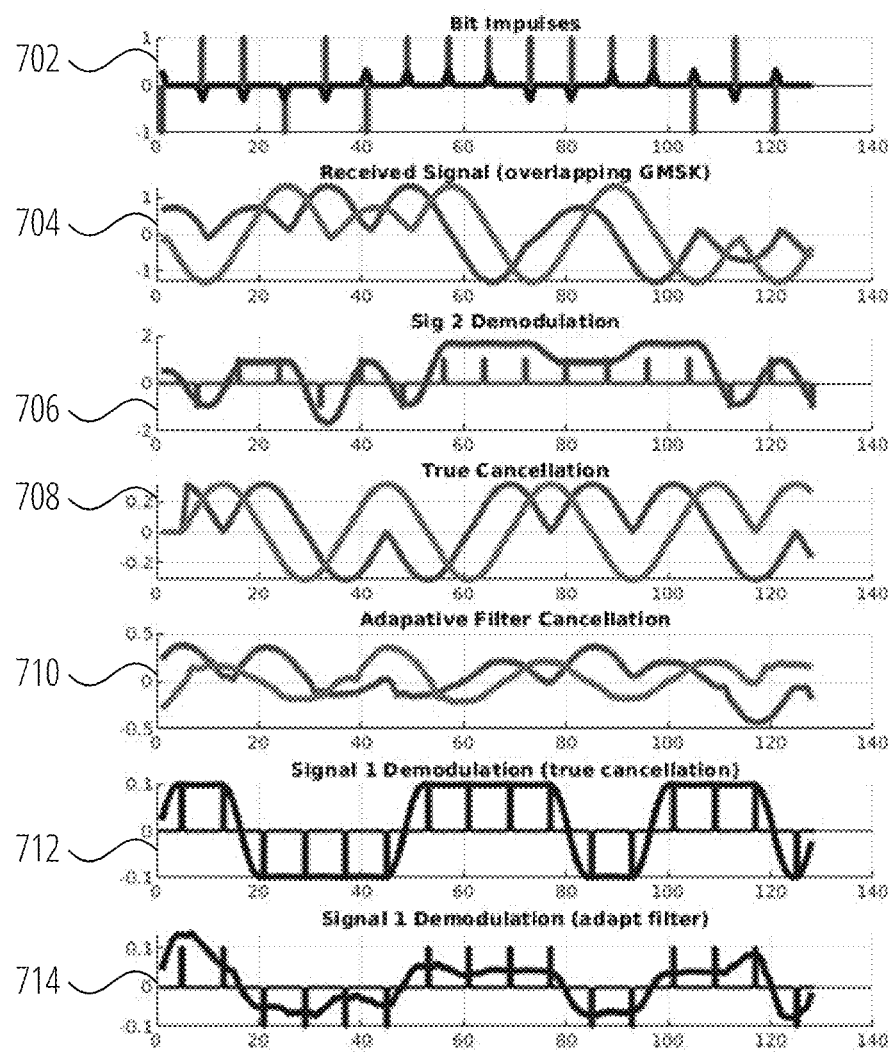
FIG. 7 visually illustrates a recursive least square filtering method according to some aspects of the present disclosure.

FIG. 7 visually illustrates a recursive least square filtering method according to some aspects of the present disclosure. FIG. 7 shows RLS adaptive filtering process 514 being applied to re-modulated S2. Plot 702 shows the bit impulses of both Signals S1 and S2 hidden within the received mixture signal (I and Q portions plotted) on plot 704. The output of the demodulation filter applied to the received signal with its down-sampled bit decisions is shown in plot 706. These bits are the estimated bits of the larger signal (e.g., S2). Plot 708 shows what the interference cancellation looks like, revealing the actual smaller signal (e.g., S1). Plot 710 shows the output of the RLS adaptive filter, which attempts to produce the smaller signal (e.g., S1). Visually, the imprecise effects may be apparent. However, as seen in the plots 712 and 714, the output of the demodulation filter applied to the RLS output can still accurately recover the correct bits.

RLS adaptive filtering process 514 may be optimized. RLS itself. For instance, the computational resources of RLS scale quadratically with the size of the adaptive filter. At a minimum, to appropriately account for the relative symbol offset of the two interfering Signals, a filter size as large as the number of samples in a symbol may be needed. Depending on the in-situ channels, such as sparse line-of-sight channels, a smaller filter may be used and hence non-linearity reduce computational demands. Other possibilities include stopping the RLS training once it appears to have converged within a certain tolerance (a configurable parameter determined based on experiments and/or empirical studies). Since the duration of the pulse is short, the adaptive filter does not need to be updated once it reaches some error tolerance (a configurable parameter determined based on experiments and/or empirical studies). In other words, the adaptive filter may be turned off after a point and reduce processing demands. Another approach is to leverage the PN sequence for training which could also be used to increase the convergence of the filter.

In some examples, in addition to or instead of RLS adaptive filtering process, block processing algorithm which can perform better than RLS before error correction may be used. When channels are truly sparse, another approach can be solving for a two parameter (carrier phase offset and delay) filter. To account for a small number of multi-paths, a channel with a finite number of taps may be used. Other adaptive filters exist such as Least Mean Square (LMS) that requires around 2*M multiplications, where M is the size of the adaptive filter. LMS converges slower than RLS but can be utilized.

As shown in FIG. 5, the output of RLS adaptive filtering process 514 may be subtracted from the received mixture signal at antenna(s) 508, at 516, which may then be de-modulated to recover S1. This demodulation includes performing demodulation process 518 and decoding the output using a Forward Error Correction (FEC) such as turbo-decoder process 520. This will be described next.

As shown in FIG. 5, at demodulation process 518, the result of subtracting the output of RLS adaptive filtering process 514 from the received mixture signal and the re-modulated S2 are used to perform de-modulation for recovering S1.

Turbo coding is a powerful Forward Error Correction (FEC) scheme that performs close to the Shannon capacity limit of a channel. Turbo coding can include two convolutional encoders—usually systematic, recursive concatenated convolutional encoders—where one encoder receives a signal as is and the other receives a scrambled version of the signal to encode. The scrambling occurs on a frame-by-frame basis according to some predetermined frame length. The output of these two encoders (parity bits), along with the original bit sequence, are multiplexed into a single bit sequence. The collection of parity bits from both encoders and the original signal bit for a single iteration of the encoding process may be referred to as a codeword. Selective codeword-by-codeword omissions of the parity bits may be applied, known as puncturing, to precisely control the coding rate. Turbo decoding method uses the Viterbi algorithm. However, the scrambled and non-scrambled portions of the coded output may be iteratively used against each other to provide a priori estimates of the bit sequence. This iterative process is what makes the performance of Turbo codes excellent. A non-limiting example of Turbo Encoder and Decoder with ⅓ and ⅙ rates may be used.

The principles behind Turbo Decoding suggest iterative methods for joint demodulation. One such method is to apply successive interference cancelation, where the recovered bits for the smaller signal is used to improve the demodulation of the larger signal. This process can then be repeated. Another method known as Turbo MUD that can leverage the Turbo Coding and uses an iterative Bayesian approach similar to Turbo Decoding. Both successive Interference Cancellation and Turbo MUD can provide better BERs at lower power differentials.

FIG. 5 also illustrates a process 522 that may be referred to as training process 522. In one example, Recursive least squares (RLS) is an adaptive filter algorithm that recursively finds the coefficients that minimize a weighted linear least squares cost function relating to the input signals. Other approaches include the least mean squares (LMS) that aim to reduce the mean square error. For RLS, the input signals are considered deterministic and training process 522 can include improving an argument of the cost function recursively. In this case, the Channel Estimate vector 'w' for Signal S2 is estimated recursively such that the error is minimized. RLS exhibits fast convergence. However, this benefit comes at the cost of high computational complexity. In another example, LMS algorithm may be used to reduce the computational complexity at the cost of speed of convergence in the training.

Hereinafter, results of simulations using CAMICA's filtering techniques will be described.

Comprehensive end-to-end simulations demonstrating effectiveness of asynchronous MUD algorithmic have been conducted. The method is simulated as applied to interfering pulses as described with an SNR of 6 dB. That is, the smaller signal, S1, was 6 dB above the noise floor. The payloads in pulses were Turbo Coded with rates ⅓ or ⅙ with a coded output of around 5,000 symbols. Each pulse payload had a GMSK modulated PN sequence of length 255 at the beginning and end. Between each of the two pulses, quasi-orthogonal PN sequences were assumed. Asynchronous interference, that is, GMSK pulses with randomly chosen carrier phase offsets and symbol phase offsets were simulated. Four samples per symbol with a relative bandwidth of 0.25 were used. Parameter estimation was done using the training sequences attached to the pulses and an RLS adaptive filter was used.

Variably Overlapping Pulses in the Frequency Domain: First pulses completely overlapping in time but variably overlapping in frequency were simulated. BER performance contours with and without CAMICA when INR and Relative Frequency Offset were varied for Turbo Coding rates ⅓ and ⅙. For both coding rates, the BER curves are similar. The larger signal, S2, has a simpler BER curve. When S2 is far enough in frequency from S1, S2 is perfectly demodulated. As S2 moves closer in frequency S2 requires greater power than S1 to be perfectly demodulated. When S2 is completely on top of S1 in power, it is perfectly demodulated when it is a certain amount of dB larger in power than S1. As expected, without CAMICA, an acceptable BER for both S1 and S2 occurs only at a 0.25 or greater relative frequency offset for comparable relative power levels, which is in effect equivalent to using an adjacent channel. If the signal in the adjacent channel is too large, that is the INR is large, the shoulders of S2's power spectral density increases and spills over to the channel and result in worse performance. This explains the increase in BER for S1 as the INR increases when CAMICA is not used. When CAMICA is applied, the BER curves for S1 change and CAMICA's performance is driven by the accuracy of the S2 demodulation. In the case of ⅓ coding, for frequency offsets beyond 0.12 relative frequency offset, or (1−0.12/0.25)=52% channel overlap, perfect demodulation is achieved at any relative power differences. For complete frequency overlap, perfect demodulation can be achieved when there is a 2.2 dB power difference. In the case of ⅙ coding, for frequency offsets beyond 0.07 relative frequency offset, or (1−0.07/0.25)=72% channel overlap, perfect demodulation is achieved at any relative power differences. For complete frequency overlap, perfect demodulation can be achieved when there is a 1.8 dB power difference. Simulations include the scenario when the larger signal (e.g., S2) is misidentified by simulating the INR down to 4 dB, which is below the fixed power of S1 at 6 dB. In this case, even when the smaller signal is misidentified as the larger, there is still room to perform perfect demodulation.

Variably Overlapping Pulses in the Time Domain: cases when pulses are completely overlapping in frequency but partially overlapping in time were also simulated. Without CAMICA, when there is no time overlap, there is no conflict and nothing to resolve. When there is a tiny percentage of overlap in time, Turbo coding will help resolve the errors. However, once is there is even a marginal overlap, the BER for the smaller signal (e.g., S1), increases significantly. The BER for the larger signal (e.g., S2), may also be significantly impacted unless S2 is substantially larger than S1.

As discussed, without CAMICA, the BERs for S1 and S2 are zero when there is zero percent overlap while the BERs increase as the overlap increases. When CAMICA is applied, the BER of S1 changes and CAMICA's performance is driven by S2. With ⅓ coding, as in the above-described simulations with frequency offset, perfect demodulation is achieved with complete frequency overlap when there is about a 2.2 dB power difference. In the case of ⅙ coding, perfect demodulation is also achieved with complete frequency overlap when there is about a 1.8 dB power difference. In the slight change of a tiny overlap percentage, the power difference can be lower.

Variable Time and Frequency Overlaps: In another experiment, S1 at 6 dB and S2 at 7 dB were simulated with varied channel percent overlaps and time percent overlaps a. Results show that pulses can be resolved completely in any scenario using COMICA's techniques described herein—complete time overlap and partial frequency overlap up to 80%.

Figure 8:
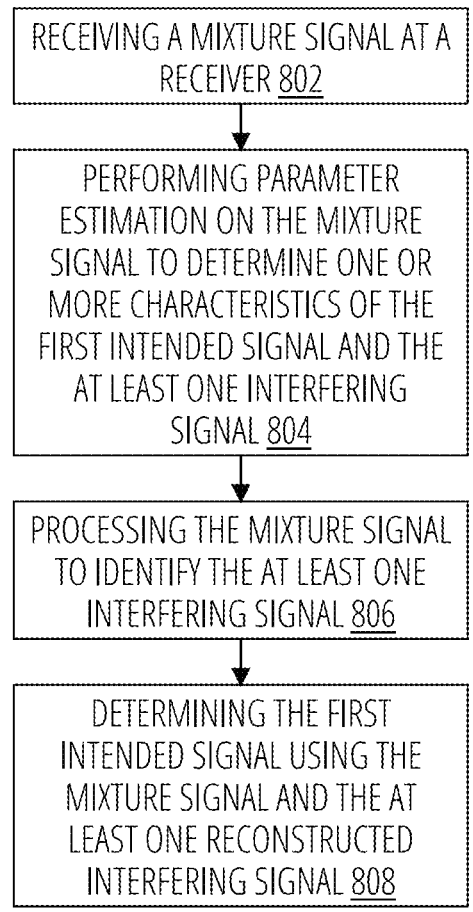
FIG. 8 is a flowchart of an example CAMICA filtering method for interference cancellation according to some aspects of the present disclosure.

FIG. 8 is a flowchart of an example CAMICA filtering method for interference cancellation according to some aspects of the present disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. Steps of FIG. 8 may be performed by an FPGA and/or a processor of Receiver 402, where such processor may execute computer-readable instructions stored on a memory of Receiver 402.

According to some examples, the method includes receiving a mixture signal at a receiver at block 802 (e.g., a mixture signal of S1 and S2, as described above). The mixture signal may include a first intended signal (e.g., S1) and at least one interfering signal (e.g., S2) overlappingly transmitted with the first intended signal. In one example, the first intended signal and the at least one interfering signal are overlappingly transmitted in one or more of frequency domain and/or time domain. In one example, the mixture signal is a signal transmitted within a tactical data link network. In one example, the mixture signal is a wireless signal transmitted within a Wi-Fi system. In one example, the first intended signal and the at least one interfering Signals are wireless Signals associated with different wireless communication protocols (e.g., radar, WiFi, 4G/5G/6G, Lora, etc.).

According to some examples, the method includes performing parameter estimation on the mixture signal to determine one or more characteristics of the first intended signal and the at least one interfering signal at block 804. In one example, the parameter estimation is performed using Cross Layer Sensing, as described above with reference to FIGS. 4 and 5 (e.g., using CLS process 510).

According to some examples, the method includes processing the mixture signal to identify the at least one interfering signal at block 806. In one example, identifying the at least one interfering signal may be based on the one or more characteristics of the first intended signal and the at least one interfering signal (which may have been derived using CLS and hence parameter estimation).

In one example, the processing further includes de-modulating the at least one interfering signal to yield at least one de-modulated interfering signal, followed by re-modulating the at least one de-modulated interfering signal to yield the re-modulated version of each of the at least one interfering signal. This may be performed using de-modulation and re-modulation process 512 described with reference to FIG. 5.

In one example, the processing can further include applying an adaptive filtering to a re-modulated version of each of the at least one interfering signal to yield at least one reconstructed interfering signal. The adaptive filtering may utilize a RLS adaptive filtering. This may be performed according to RLS adaptive filtering process 514 of FIG. 5.

According to some examples, the method further includes determining the first intended signal (e.g., S1) using the mixture signal and the at least one reconstructed interfering signal at block 808. In one example, the at least one reconstructed interfering signal may be subtracted from the mixture signal to yield an estimated first intended signal. This may be performed according to process 516 of FIG. 5.

In one example, the result of the subtraction and re-modulated at least one interfering signal (e.g., S2) may be used to perform de-modulating of the estimated first intended signal to yield a de-modulated first intended signal. This may be performed according to demodulation process 518 of FIG. 5. The de-modulated S1 may then be decoded to recover the first intended signal. This may be performed using turbo-decoder process 520 and the above-described turbo-decoding of FIG. 5.

CAMICA's filtering techniques described above for IC and MUD in face of MUI provide the following non-limiting advantages.

CAMICA's filtering techniques achieve transmit, receive, and spatial Optimization to boost capacity in saturated network situations (e.g., TDL networks, WiFi networks, etc.). These improvements can be achieved in: 1. Message overlap statistics in frequency and time, 2. Multi-User Detection of overlapped pulses, characterization and de-coupling of aggregate pulse signals to recreate clean original signal representations, 3. Intelligent use of error and erasure decoding, 4. Transmit delay for collision avoidance, 5. Modification of SPMA transmit backoff curve configuration parameters, 6. Use of Antenna Gain variation to improve message overlap discernment, 7. Smart SPMA Message Scheduling to reduce collisions. On the receive-side, CAMICA's filtering techniques leverage modern receiver digital compensation algorithms to increase network capacity. Blind and/or Semi-Blind Asynchronous Multi-User Detection (MUD) may be implemented without any knowledge of the underlying waveform but enhanced with the knowledge of Pseudo Noise (PN) sequences. Through extensive modeling and simulations, CAMICA's filtering techniques demonstrated effective capacity improvement of greater than 70%. CAMICA's filtering techniques do not disturb legacy anti jam functions and enhance throughput during heavy traffic. CAMICA's filtering techniques are cognizant of FPGA resource limitations and utilizes a limited footprint appliqué approach intended to optimally utilize existing radio FPGAs.

In another aspect, transmit-side approaches may be utilized to include modification of SPMA backoff curves to allowed receiver-side implemented CAMICA's filtering techniques to increase network throughput and performed an analysis of gain variations and hence enhance discrimination and identification of overlapping signals.

Figure 9:
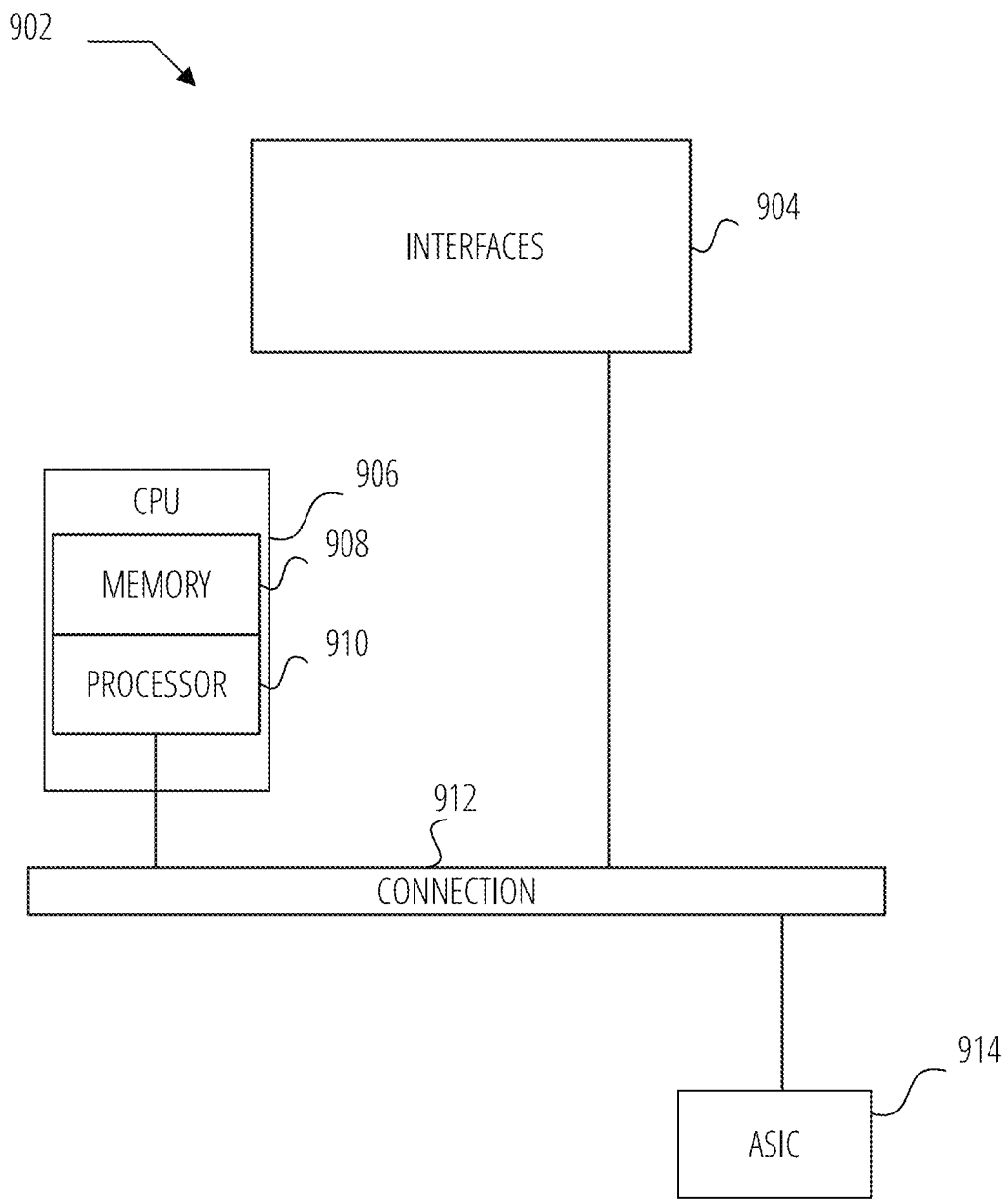
FIG. 9 illustrates an example Network Device according to some aspects of the present disclosure.

FIG. 9 illustrates an example Network Device according to some aspects of the present disclosure. Example Network Device 1000 may be suitable for performing functionalities of any network component described above with reference to FIGS. 1-8 including but not limited to, transmitters 104, receivers 112, etc.

Network Device 902 includes Interfaces 904, central processing unit (CPU) CPU 906, Interfaces 904, Connection 912 (e.g., a PCI bus), and ASIC 914. When acting under the control of appropriate software or firmware, CPU 906 is responsible for executing packet management, error detection, and/or routing functions. CPU 906 preferably accomplishes all these functions under the control of software including an operating system and any appropriate applications software. CPU 906 may include one or more Processors Processor 910, such as a Processor from the INTEL X86 family of microprocessors. In some cases, Processor 910 can be especially designed hardware for controlling the operations of Network Device 902. In some cases, a Memory 908 (e.g., non-volatile RAM, ROM, etc.) also forms part of CPU 906. However, there are many different ways in which Memory could be coupled to the system.

Interfaces 904 are typically provided as modular interface cards (sometimes referred to as "line cards"). Generally, they control the sending and receiving of data packets over the network and sometimes support other peripherals used with Network Device 902. Among the Interfaces that may be provided are Ethernet Interfaces, frame relay Interfaces, cable Interfaces, DSL Interfaces, token ring Interfaces, and the like. In addition, various very high-speed Interfaces may be provided such as fast token ring Interfaces, wireless Interfaces, Ethernet Interfaces, Gigabit Ethernet Interfaces, ATM Interfaces, HSSI Interfaces, POS Interfaces, FDDI Interfaces, WIFI Interfaces, 3G/4G/5G/6G cellular Interfaces, CAN BUS, LoRA, and the like. Generally, these Interfaces may include ports appropriate for communication with the appropriate media. In some cases, they may also include an independent Processor and, in some instances, volatile RAM. The independent Processors may control such communications intensive tasks as packet switching, media control, signal processing, crypto processing, and management. By providing separate Processors for the communication intensive tasks, these Interfaces allow the master CPU (e.g., CPU 906) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of Interfaces and media could also be used with Network Device 902.

Regardless of the network device's configuration, it may employ one or more Memories or Memory modules (including Memory 908) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 908 could also hold various software containers and virtualized execution environments and data.

Network Device 902 can also include an application-specific integrated circuit (ASIC) ASIC 914, which can be configured to perform routing and/or switching operations. ASIC 612 can communicate with other components in Network Device 600 via Connection 912, to exchange data and signals and coordinate various types of operations such as routing, switching, and/or data storage operations, for example.

Figure 10:
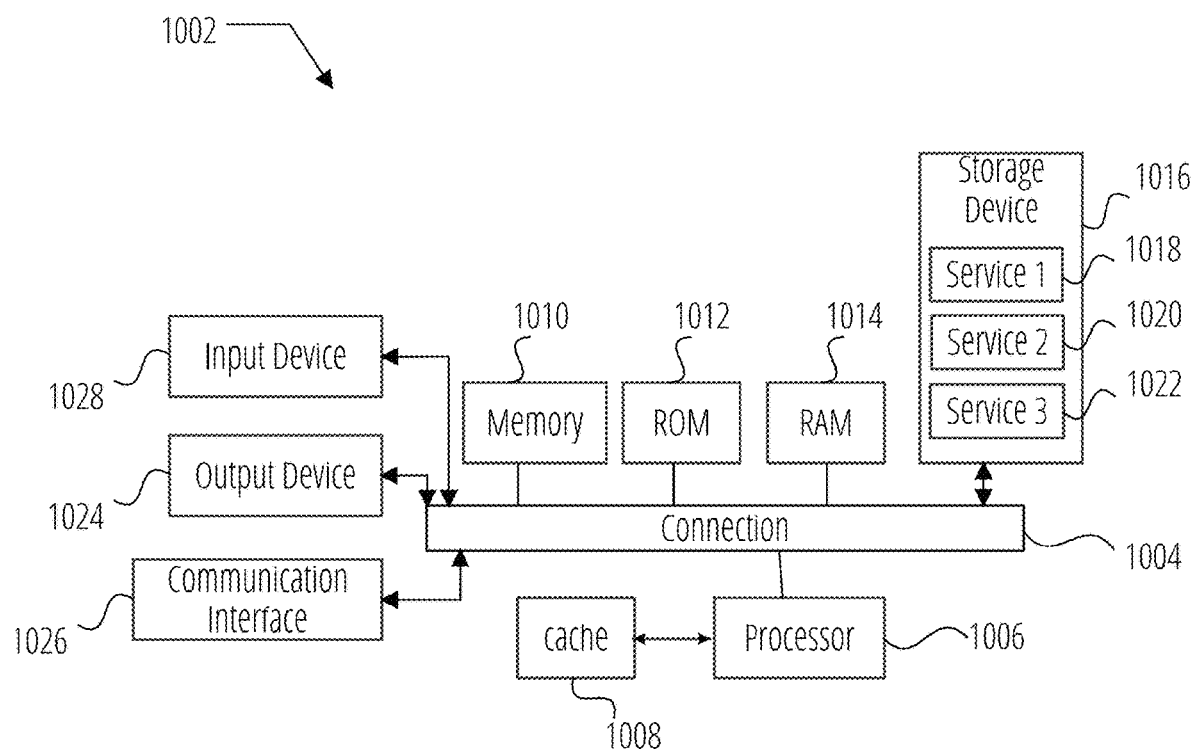
FIG. 10 illustrates an example of Computing System according to some aspects of the present disclosure.

FIG. 10 shows an example of Computing System according to some aspects of the present disclosure. Computing System 1002 can be used to implement any one or more components of a network as described with reference to FIGS. 1-8 including, but not limited to, Receivers 112, transmitters 104, etc. Components of Computing System 1002 may be in communication with each other using Connection 1004. Connection 1004 can be a physical Connection via a bus, or a direct Connection into Processor 1006, such as in a chipset Architecture. Connection 1004 can also be a virtual Connection, networked Connection, or logical Connection.

In some embodiments, Computing System 1002 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example Computing System 1002 includes at least one processing unit (CPU or Processor 1006) and Connection 1004 that couples various system components including system Memory 1010, such as read-only Memory (ROM) 1012 and random-access Memory (RAM) 1014 to Processor 1006. Computing System 1002 can include cache 1008 of high-speed memory 1010 connected directly with, in close proximity to, or integrated as part of Processor 1006.

Processor 1006 can include any general-purpose and a hardware service or software service, such as service 1 1018, service 2 1020, and service 3 1022 stored in storage device 1016, configured to control Processor 1006 as well as a special-purpose Processor where software instructions are incorporated into the actual Processor design. Processor 1006 may essentially be a completely self-contained Computing System, containing multiple cores or processors, a bus, memory controller, cache, etc. A multi-core Processor may be symmetric or asymmetric.

To enable user interaction, Computing System 1002 includes input device 1028, which can represent any number of input mechanisms, such as a microphone for speech, a touch-sensitive screen for gesture or graphical input, keyboard, mouse, motion input, speech, etc. Computing System 1002 can also include output device 1024, which can be one or more of a number of output mechanisms known to those of skill in the art. In some instances, multimodal systems can enable a user to provide multiple types of input/output to communicate with Computing System 1002. Computing System 1002 can include communications communication interface 1026, which can generally govern and manage the user input and system output. There is no restriction on operating on any particular hardware arrangement, and therefore the basic features here may easily be substituted for improved hardware or firmware arrangements as they are developed.

Storage device 1016 can be a non-volatile Memory device and can be a hard disk or other types of computer readable media which can store data that are accessible by a computer, such as magnetic cassettes, flash Memory cards, solid state Memory devices, digital versatile disks, cartridges, random access Memories (RAMs), read-only Memory (ROM), and/or some combination of these devices.

Storage device 1016 can include software services, servers, services, etc., that when the code that defines such software is executed by Processor 1006, it causes the system to perform a function. In some embodiments, a hardware service that performs a particular function can include the software component stored in a computer-readable medium in Connection with the necessary hardware components, such as Processor 1006, Connection 1004, output device 1024, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in Memory of a client device and/or one or more servers of a content management system and perform one or more functions when a Processor executes the software associated with the service. In some embodiments, a service is a program or a collection of programs that carry out a specific function. In some embodiments, a service can be considered a server. The Memory can be a non-transitory computer-readable medium.

In some embodiments, the computer-readable storage devices, mediums, and Memories can include a cable or wireless signal containing a bit stream and the like. However, when mentioned, non-transitory computer-readable storage media expressly exclude media such as energy, carrier Signals, electromagnetic waves, and Signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state Memory devices, flash Memory, USB devices provided with non-volatile Memory, networked storage device(s), and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language or other language reciting "at least one of" a set and/or "one or more" of a set indicates that one member of the set or multiple members of the set (in any combination) satisfy the claim.

For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising;
   receiving a mixture signal at a receiver, the mixture signal including a first intended signal and at least one interfering signal overlappingly transmitted with the first intended signal;
   processing the mixture signal to identify the at least one interfering signal, the processing including at least applying an adaptive filtering to a re-modulated version of each of the at least one interfering signal to yield at least one reconstructed interfering signal; and
   determining the first intended signal using the mixture signal and the at least one reconstructed interfering signal.

2. The method of claim 1, wherein the processing comprises:
   performing parameter estimation on the mixture signal to determine one or more characteristics of the first intended signal and the at least one interfering signal;
   identifying the at least one interfering signal based on the one or more characteristics of the first intended signal and the at least one interfering signal; and
   processing the at least one interfering signal.

3. The method of claim 2, wherein processing the at least one interfering signal comprises:
   de-modulating the at least one interfering signal to yield at least one de-modulated interfering signal; and
   re-modulating the at least one de-modulated interfering signal to yield the re-modulated version of each of the at least one interfering signal.

4. The method of claim 2, wherein the parameter estimation is performed using Cross Layer Sensing.

5. The method of claim 1, wherein the adaptive filtering is a Recursive Least Squares (RLS) adaptive filtering.

6. The method of claim 1, wherein determining the first intended signal comprises:
   subtracting the at least one reconstructed interfering signal from the mixture signal to yield an estimated first intended signal;
   de-modulating the estimated first intended signal to yield a de-modulated first intended signal; and
   applying a Forward Error Correction (FEC) to recover the first intended signal.

7. The method of claim 1, wherein the first intended signal and the at least one interfering signal are overlappingly transmitted in one or more of a frequency domain or a time domain.

8. The method of claim 1, wherein the mixture signal is a signal transmitted within a tactical data link network.

9. The method of claim 1, wherein the mixture signal is a wireless signal transmitted within a Wi-Fi system.

10. The method of claim 1, wherein the first intended signal and the at least one interfering signal are wireless signals associated with different wireless communication protocols.

11. An apparatus comprising:
    one or more memories having computer-readable instructions stored therein; and
    one or more processors configured to execute the computer-readable instructions to:
       receive a mixture signal, the mixture signal including a first intended signal and at least one interfering signal overlappingly transmitted with the first intended signal;
       process the mixture signal to identify the at least one interfering signal, the processing including at least applying an adaptive filtering to a re-modulated version of each of the at least one interfering signal to yield at least one reconstructed interfering signal; and
       determine the first intended signal using the mixture signal and the at least one reconstructed interfering signal.

12. The apparatus of claim 11, wherein the one or more processors are configured to execute the computer-readable instructions to process the mixture signal by:
    performing parameter estimation on the mixture signal to determine one or more characteristics of the first intended signal and the at least one interfering signal;
    identifying the at least one interfering signal based on the one or more characteristics of the first intended signal and the at least one interfering signal; and
    processing the at least one interfering signal.

13. The apparatus of claim 12, wherein the one or more processors are configured to execute the computer-readable instructions to process the at least one interfering signal by:

de-modulating the at least one interfering signal to yield at least one de-modulated interfering signal; and re-modulating the at least one de-modulated interfering signal to yield the re-modulated version of each of the at least one interfering signal.

14. The apparatus of claim 12, wherein the one or more processors are configured to execute the computer-readable instructions to perform parameter estimation using Cross Layer Sensing.

15. The apparatus of claim 11, wherein the adaptive filter is a Recursive Least Squares (RLS) adaptive filtering.

16. The apparatus of claim 11, wherein the one or more processors are configured to execute the computer-readable instructions to determine the first intended signal by:

subtracting the at least one reconstructed interfering signal from the mixture signal to yield an estimated first intended signal;

de-modulating the estimated first intended signal to yield a de-modulated first intended signal; and applying a Forward Error Correction to recover the first intended signal.

17. The apparatus of claim 11, wherein the first intended signal and the at least one interfering signal are overlappingly transmitted in one or more of a frequency domain or a time domain.

18. The apparatus of claim 11, wherein the mixture signal is a signal transmitted within a tactical data link network.

19. The apparatus of claim 11, wherein the mixture signal is a wireless signal transmitted within a Wi-Fi system.

20. The apparatus of claim 11, wherein the first intended signal and the at least one interfering signal are wireless signals associated with different wireless communication protocols.

* * * * *